(12) United States Patent
La Forest et al.

(10) Patent No.: US 10,035,305 B2
(45) Date of Patent: Jul. 31, 2018

(54) METHOD OF MAKING CARBON FIBER PREFORMS

(71) Applicant: Honeywell International Inc., Morristown, NJ (US)

(72) Inventors: Mark L. La Forest, Granger, IN (US); Slawomir T. Fryska, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 270 days.

(21) Appl. No.: 14/788,217

(22) Filed: Jun. 30, 2015

(65) Prior Publication Data
US 2017/0001373 A1 Jan. 5, 2017

(51) Int. Cl.
*B29C 70/34* (2006.01)
*B29C 70/68* (2006.01)
(Continued)

(52) U.S. Cl.
CPC .......... *B29C 67/0081* (2013.01); *B28B 1/001* (2013.01); *B29B 11/16* (2013.01); *B29C 64/165* (2017.08); *B29C 70/021* (2013.01); *B32B 9/007* (2013.01); *B32B 9/04* (2013.01); *B32B 9/047* (2013.01); *B32B 18/00* (2013.01); *B32B 37/02* (2013.01); *B32B 38/08* (2013.01); *B33Y 10/00* (2014.12); *B33Y 30/00* (2014.12); *B33Y 70/00* (2014.12); *B33Y 80/00* (2014.12); *C04B 35/83* (2013.01); *C04B 38/0032* (2013.01); *F16D 65/126* (2013.01); *F16D 69/023* (2013.01); *B29K 2105/12* (2013.01); *B29K 2105/16* (2013.01); *B29K 2307/04* (2013.01);
(Continued)

(58) Field of Classification Search
CPC ... B28B 1/001; B29C 64/165; B29C 67/0081; B29C 70/021; B29C 70/34; B29C 70/68; B29C 70/70; B29C 41/20; B29C 41/22; B33Y 10/00; B33Y 70/00; B33Y 80/00; C01B 32/00; C01B 32/05
USPC ... 264/113, 131, 255, 279, 279.1, 29.1, 257, 264/258; 423/447.1, 447.4
See application file for complete search history.

(56) References Cited

U.S. PATENT DOCUMENTS 3,028,284 A 4/1962 Reeves
3,596,314 A 8/1971 Krugler
(Continued)

FOREIGN PATENT DOCUMENTS

CN 101511569 A 8/2009
CN 103939509 A 7/2014
(Continued)

OTHER PUBLICATIONS

"Application of nanoparticles could improve ALM components," technical trends ALM, MPR, Elsevier Ltd., Nov.-Dec. 2012, 3 pp.
(Continued)

*Primary Examiner* — Leo B Tentoni
(74) *Attorney, Agent, or Firm* — Shumaker & Sieffert, P.A.

(57) ABSTRACT

In some examples, a method includes depositing a mixture including a resin and an additive powder via a print head of a three-dimensional printing system to form a carbon fiber preform including a plurality of individual carbon fiber layers, wherein each individual layer of the plurality of individual carbon fiber layers includes a plurality of carbon fibers and the mixture of the resin and the additive powder.

15 Claims, 8 Drawing Sheets

(51) Int. Cl.

| | | |
|---|---|---|
| *B29C 70/70* | (2006.01) | |
| *B29C 67/00* | (2017.01) | |
| *B29C 70/02* | (2006.01) | |
| *B28B 1/00* | (2006.01) | |
| *B32B 37/02* | (2006.01) | |
| *C04B 35/83* | (2006.01) | |
| *C04B 38/00* | (2006.01) | |
| *F16D 65/12* | (2006.01) | |
| *F16D 69/02* | (2006.01) | |
| *B33Y 80/00* | (2015.01) | |
| *B33Y 10/00* | (2015.01) | |
| *B33Y 30/00* | (2015.01) | |
| *B32B 9/00* | (2006.01) | |
| *B32B 9/04* | (2006.01) | |
| *B32B 18/00* | (2006.01) | |
| *B33Y 70/00* | (2015.01) | |
| *B29B 11/16* | (2006.01) | |
| *B32B 38/08* | (2006.01) | |
| *B29C 64/165* | (2017.01) | |
| *C04B 111/00* | (2006.01) | |
| *B29K 105/12* | (2006.01) | |
| *B29K 105/16* | (2006.01) | |
| *B29K 307/04* | (2006.01) | |
| *B29K 507/04* | (2006.01) | |
| *B29K 509/04* | (2006.01) | |
| *B29L 31/16* | (2006.01) | |
| *B29K 309/02* | (2006.01) | |

(52) U.S. Cl.
CPC ...... *B29K 2309/02* (2013.01); *B29K 2507/04* (2013.01); *B29K 2509/04* (2013.01); *B29K 2995/0072* (2013.01); *B29L 2031/16* (2013.01); *B32B 2250/20* (2013.01); *B32B 2262/106* (2013.01); *B32B 2264/107* (2013.01); *B32B 2264/108* (2013.01); *B32B 2475/00* (2013.01); *C04B 2111/00362* (2013.01); *C04B 2235/3826* (2013.01); *C04B 2235/3843* (2013.01); *C04B 2235/3847* (2013.01); *C04B 2235/424* (2013.01); *C04B 2235/425* (2013.01); *C04B 2235/48* (2013.01); *C04B 2235/5248* (2013.01); *C04B 2235/6026* (2013.01); *C04B 2235/614* (2013.01); *C04B 2235/616* (2013.01); *C04B 2237/385* (2013.01); *C04B 2237/582* (2013.01); *C04B 2237/62* (2013.01); *F16D 2200/0047* (2013.01); *F16D 2200/0091* (2013.01)

(56) References Cited

U.S. PATENT DOCUMENTS

| | | |
|---|---|---|
| 3,703,255 A | 11/1972 | Wade |
| 3,975,128 A | 8/1976 | Schluter |
| 3,982,877 A | 9/1976 | Wyeth et al. |
| 4,264,556 A | 4/1981 | Kumar et al. |
| 4,428,906 A | 1/1984 | Rozmus |
| 4,756,680 A | 7/1988 | Ishii |
| 4,837,073 A | 6/1989 | McAllister et al. |
| 4,957,585 A | 9/1990 | Semff |
| 5,009,823 A | 4/1991 | Kromrey |
| 5,137,663 A | 8/1992 | Conaway |
| 5,137,755 A | 8/1992 | Fujikawa et al. |
| 5,147,588 A | 9/1992 | Okura et al. |
| 5,178,705 A | 1/1993 | Kimbara et al. |
| 5,187,001 A | 2/1993 | Brew |
| 5,242,746 A | 9/1993 | Bommier et al. |
| 5,283,109 A | 2/1994 | Kaplan et al. |
| 5,306,448 A | 4/1994 | Kromrey |
| 5,382,392 A | 1/1995 | Prevorsek et al. |
| 5,516,271 A | 5/1996 | Swenor et al. |
| 5,518,385 A | 5/1996 | Graff |
| 5,576,358 A | 11/1996 | Lem et al. |
| 5,686,144 A | 11/1997 | Thebault et al. |
| 5,759,622 A | 6/1998 | Stover |
| 5,962,135 A | 10/1999 | Walker et al. |
| 6,054,082 A | 4/2000 | Heide et al. |
| 6,093,482 A | 7/2000 | Park et al. |
| 6,110,268 A | 8/2000 | Gross et al. |
| 6,214,279 B1 | 4/2001 | Yang et al. |
| 6,221,475 B1 | 4/2001 | Domergue et al. |
| 6,245,424 B1 | 6/2001 | Lau et al. |
| 6,261,486 B1 | 7/2001 | Sulzbach et al. |
| 6,267,920 B1 | 7/2001 | Arakawa et al. |
| 6,305,925 B1 | 10/2001 | Cassani |
| 6,325,608 B1 | 12/2001 | Shivakumar et al. |
| 6,372,166 B1 | 4/2002 | Cassani |
| 6,358,565 B1 | 5/2002 | Krenkel et al. |
| 6,455,159 B1 | 9/2002 | Walker et al. |
| 6,471,800 B2 | 10/2002 | Jang et al. |
| 6,508,970 B2 | 1/2003 | Chandra |
| 6,521,152 B1 | 2/2003 | Wood et al. |
| 6,537,470 B1 | 3/2003 | Wood et al. |
| 6,555,173 B1 | 4/2003 | Forsythe et al. |
| 6,578,474 B1 | 6/2003 | Sasaki |
| 6,726,753 B2 | 4/2004 | Kouchouthakis et al. |
| 6,749,937 B2 | 6/2004 | Gray |
| 6,756,121 B2 | 6/2004 | Forsythe et al. |
| 6,884,467 B2 | 4/2005 | Walker et al. |
| 6,886,668 B2 | 5/2005 | Kouchouthakis et al. |
| 6,896,968 B2 | 5/2005 | Golecki |
| 6,939,490 B2 | 9/2005 | La Forest et al. |
| 7,025,913 B2 | 4/2006 | La Forest et al. |
| 7,052,632 B2 | 5/2006 | Lavasserie et al. |
| 7,063,870 B2 | 6/2006 | La Forest et al. |
| 7,118,805 B2 | 10/2006 | Walker et al. |
| 7,141,207 B2 | 11/2006 | Jandeska, Jr. et al. |
| 7,172,408 B2 | 2/2007 | Wood et al. |
| 7,198,739 B2 | 4/2007 | La Forest et al. |
| 7,252,499 B2 | 8/2007 | LaForest et al. |
| 7,258,896 B2 | 8/2007 | Deckard et al. |
| 7,318,717 B2 | 1/2008 | Wood et al. |
| 7,332,112 B1 | 2/2008 | Shivakumar et al. |
| 7,332,195 B2 | 2/2008 | Arico et al. |
| 7,370,738 B2 | 5/2008 | Vollweiter |
| 7,393,370 B2 | 7/2008 | Peterman, Jr. et al. |
| 7,423,072 B2 | 9/2008 | Lee et al. |
| 7,442,024 B2 | 10/2008 | La Forest et al. |
| 7,556,490 B2 | 7/2009 | Wicker et al. |
| 7,589,868 B2 | 9/2009 | Velde et al. |
| 7,632,435 B2 | 12/2009 | Simpson et al. |
| 7,681,627 B2 | 3/2010 | Schmitz et al. |
| 7,698,817 B2 | 4/2010 | Khambete et al. |
| 7,700,014 B2 | 4/2010 | Simpson et al. |
| 7,727,448 B2 | 6/2010 | Boutefeu et al. |
| 7,867,566 B2 | 1/2011 | Blanton et al. |
| 7,972,129 B2 | 7/2011 | O'Donoghue |
| 8,002,919 B2 | 8/2011 | Johnson et al. |
| 8,492,466 B2 | 7/2013 | Abe et al. |
| 8,501,033 B2 | 8/2013 | Southwell et al. |
| 8,592,519 B2 | 11/2013 | Martinoni |
| 8,597,772 B2 | 12/2013 | La Forest et al. |
| 8,742,014 B2 | 6/2014 | Hongo |
| 2001/0030094 A1 | 10/2001 | Pareti |
| 2002/0047227 A1 | 4/2002 | Matsumoto |
| 2003/0021901 A1 | 1/2003 | Gasse |
| 2003/0030188 A1 | 2/2003 | Spengler |
| 2003/0111752 A1 | 6/2003 | Wood et al. |
| 2003/0143436 A1 | 7/2003 | Forsythe et al. |
| 2003/0214064 A1 | 11/2003 | Shin et al. |
| 2004/0020728 A1 | 2/2004 | Koucouthakis et al. |
| 2004/0113302 A1 | 6/2004 | La Forest et al. |
| 2004/0168612 A1 | 9/2004 | Saver |
| 2004/0202896 A1 | 10/2004 | Gray |
| 2004/0219510 A1 | 11/2004 | Lowery et al. |
| 2006/0046059 A1 | 3/2006 | Arico et al. |
| 2006/0069176 A1 | 3/2006 | Bowman et al. |
| 2006/0197244 A1 | 9/2006 | Simpson et al. |
| 2006/0232392 A1 | 10/2006 | Emmett et al. |

(56) References Cited

U.S. PATENT DOCUMENTS

| | | |
|---|---|---|
| 2006/0267252 A1 | 11/2006 | Steinmann et al. |
| 2006/0279012 A1 | 12/2006 | Simpson et al. |
| 2007/0063378 A1 | 3/2007 | O'Donoghue |
| 2007/0154712 A1 | 7/2007 | Mazany et al. |
| 2007/0218208 A1 | 9/2007 | Walker et al. |
| 2008/0318010 A1 | 12/2008 | Wozniak et al. |
| 2009/0145314 A1 | 6/2009 | Botrie |
| 2009/0169825 A1 | 7/2009 | Farmer et al. |
| 2009/0176034 A1 | 7/2009 | Ruuttu et al. |
| 2009/0229926 A1 | 9/2009 | Schaefer |
| 2009/0298962 A1 | 12/2009 | Studer et al. |
| 2009/0321979 A1 | 12/2009 | Hiraide |
| 2010/0000070 A1 | 1/2010 | La Forest et al. |
| 2011/0030940 A1 | 2/2011 | Takeda |
| 2012/0104659 A1 | 5/2012 | La Forest et al. |
| 2012/0251829 A1 | 10/2012 | Xu et al. |
| 2012/0304449 A1 | 12/2012 | Jackson et al. |
| 2013/0157826 A1 | 6/2013 | Preckel et al. |
| 2013/0174969 A1 | 7/2013 | Karb et al. |
| 2013/0237636 A1 | 9/2013 | Strauss |
| 2013/0244039 A1 | 9/2013 | Peters et al. |
| 2013/0248304 A1 | 9/2013 | Lee et al. |
| 2013/0284548 A1 | 10/2013 | Guether et al. |
| 2014/0134335 A1 | 5/2014 | Pridoehl et al. |
| 2014/0194328 A1 | 7/2014 | Alessi |
| 2014/0298728 A1* | 10/2014 | Keshavan ............... E21B 10/56 51/298 |
| 2014/0356612 A1 | 12/2014 | Sano et al. |
| 2014/0361460 A1 | 12/2014 | Mark |
| 2015/0018136 A1* | 1/2015 | Goldstein ............... B33Y 10/00 264/308 X |
| 2015/0093506 A1 | 4/2015 | Bucci et al. |
| 2015/0321187 A1 | 11/2015 | Dias et al. |
| 2016/0046803 A1 | 2/2016 | Boday et al. |
| 2016/0082695 A1 | 3/2016 | Swartz et al. |
| 2016/0151982 A1 | 6/2016 | Sand |
| 2016/0346997 A1* | 12/2016 | Lewis ................... B33Y 10/00 |

FOREIGN PATENT DOCUMENTS

| | | |
|---|---|---|
| CN | 104451606 A | 3/2015 |
| CN | 104496508 A | 4/2015 |
| DE | 102007057450 A1 | 6/2009 |
| DE | 102014006432 A1 | 11/2015 |
| EP | 1165191 A1 | 1/2002 |
| EP | 1724245 A2 | 11/2006 |
| EP | 1731292 A2 | 12/2006 |
| EP | 2295227 A2 | 3/2011 |
| EP | 2450170 A2 | 9/2012 |
| EP | 3095593 A1 | 11/2016 |
| GB | 2386951 | 11/2010 |
| GB | 2470098 | 11/2010 |
| JP | 2013088196 | 5/2013 |
| JP | 5352893 B2 | 11/2013 |
| WO | 9908980 A | 2/1999 |
| WO | 0054852 A1 | 9/2000 |
| WO | 2004050319 A1 | 6/2004 |
| WO | 2004052629 A1 | 6/2004 |
| WO | 2004106766 | 12/2004 |
| WO | 2006033373 A1 | 3/2006 |
| WO | 2006086167 A1 | 8/2006 |
| WO | 2013126981 A1 | 9/2013 |
| WO | 2014035382 A1 | 3/2014 |
| WO | 2014060430 A1 | 4/2014 |
| WO | 2014134224 A2 | 9/2014 |
| WO | 2014153535 A2 | 9/2014 |
| WO | 2014174540 A1 | 10/2014 |
| WO | 2014175625 A1 | 10/2014 |
| WO | 2015006697 A1 | 1/2015 |
| WO | 2015038260 A2 | 3/2015 |
| WO | 2015053658 A1 | 4/2015 |

OTHER PUBLICATIONS

"Arevo Labs introduces carbon fiber reinforced polymers to 3D print ultra-strong parts," 3D printer and 3D printing news, www.3ders.org, Mar. 24, 2014, 9 pp.

"Carbon-fiber filled Nylon—A Material Alternative," Northwest Rapid Manufacturing, Jun. 25, 2012, 3 pp.

"Mark One, the world's first carbon fiber 3D printer now available for pre-order," 3D printer and 3D printing news, www.3ders.org, Feb. 18, 2014, 11 pp.

Black, "3D Printing continuous carbon fiber composites?," Composites World, Gardner Business Media, Inc., May 1, 2014, 8 pp.

Divyashree et al., "Design, Implement and Develop CNT-Metal Composite PCB Wiring Using a Metal 3D Printer," International Journal of Scientific & Engineering Research, vol. 5, No. 5, May 2014, 5 pp.

Krassenstein, "3DXTech's Carbon Nanotube 3D Printer Filament is Here: Exclusive images and details," 3DXTECH, May 13, 2014, 2 pp.

Thryft, "3D Printing High-Strength Carbon Composites Using PEEK, PAEK," Design News, Engineering Materials, Apr. 14, 2014, 5 pp.

Crandall, "Where Will Additive Manufacturing Take Us?," APICS Magazine, Jan./Feb. 2013, 3 pp.

U.S. Appl. No. 14/711,550, by Honeywell International Inc. (Inventors: Slawomir T. Fryska et al.), filed May 13, 2015.

U.S. Appl. No. 14/711,590, by Honeywell International Inc. (Inventors: Jeffrey Troester et al.), filed May 13, 2015.

U.S. Appl. No. 14/711,508, by Honeywell International Inc. (Inventors: Slawomir T. Fryska et al.), filed May 13, 2015.

Senese, "MarkForged Lets you 3D Print with Carbon Fiber and Kevlar on a Budget," Makezine, retrieved from URL: http://makezine.com/ 2015/01/ 15/3d-printed-carbon-fiber-markforged and accessed Nov. 11, 2016, Jan. 15, 2015, 6 pp.

Extended Search Report from counterpart European Application No. 16174850.4, dated Nov. 16, 2016, 8 pp.

Fatz, et al., "Manufacture of Functionally Gradient Carbon-Carbon Composites," Proceedings of the 17 th Technical Conference of the American Society of Composites, Oct. 21-23, 2002, Purdue University, West Lafayette, Ind., 9 pp.

Tekinalp et al., "Highly oriented carbon fiber-polymer composites via additive manufacturing," Composites Science and Technology, ElSevier, Oct. 9, 2014, 7 pp.

Response to Extended Search Report dated Nov. 16, 2016, from counterpart European Application No. 16174850.4, filed Mar. 13, 2017, 11 pp.

U.S. Appl. No. 15/048,840, by Honeywell International Inc. (Inventors: Jeffrey Rowe et al.), filed Feb. 19, 2016.

U.S. Appl. No. 14/854,993, by Honeywell International Inc. (Inventors: Mark L. La Forest et al.), filed Sep. 15, 2015.

U.S. Appl. No. 14/954,783, by Honeywell International Inc. (Inventors: Mark L. La Forest et al.), filed Nov. 30, 2015.

U.S. Appl. No. 14/711,426, by Honeywell International Inc. (Inventors: Jeffrey Troester et al.), filed May 13, 2015.

Vie et al., "Inkjet printing of 200 nm monodisperse carbon nanoparaticles: from nanoparticles synthesis to smart ink formulation," NSTI-Nanotech, vol. 2, May 2013, pp. 243-246.

U.S. Appl. No. 62/161,109, by Honeywell International Inc. (Inventors: Jeffrey Rowe et al.), filed May 13, 2015.

Examination Report from counterpart European Application No. 16174850.4, dated Feb. 20, 2018, 8 pp.

\* cited by examiner

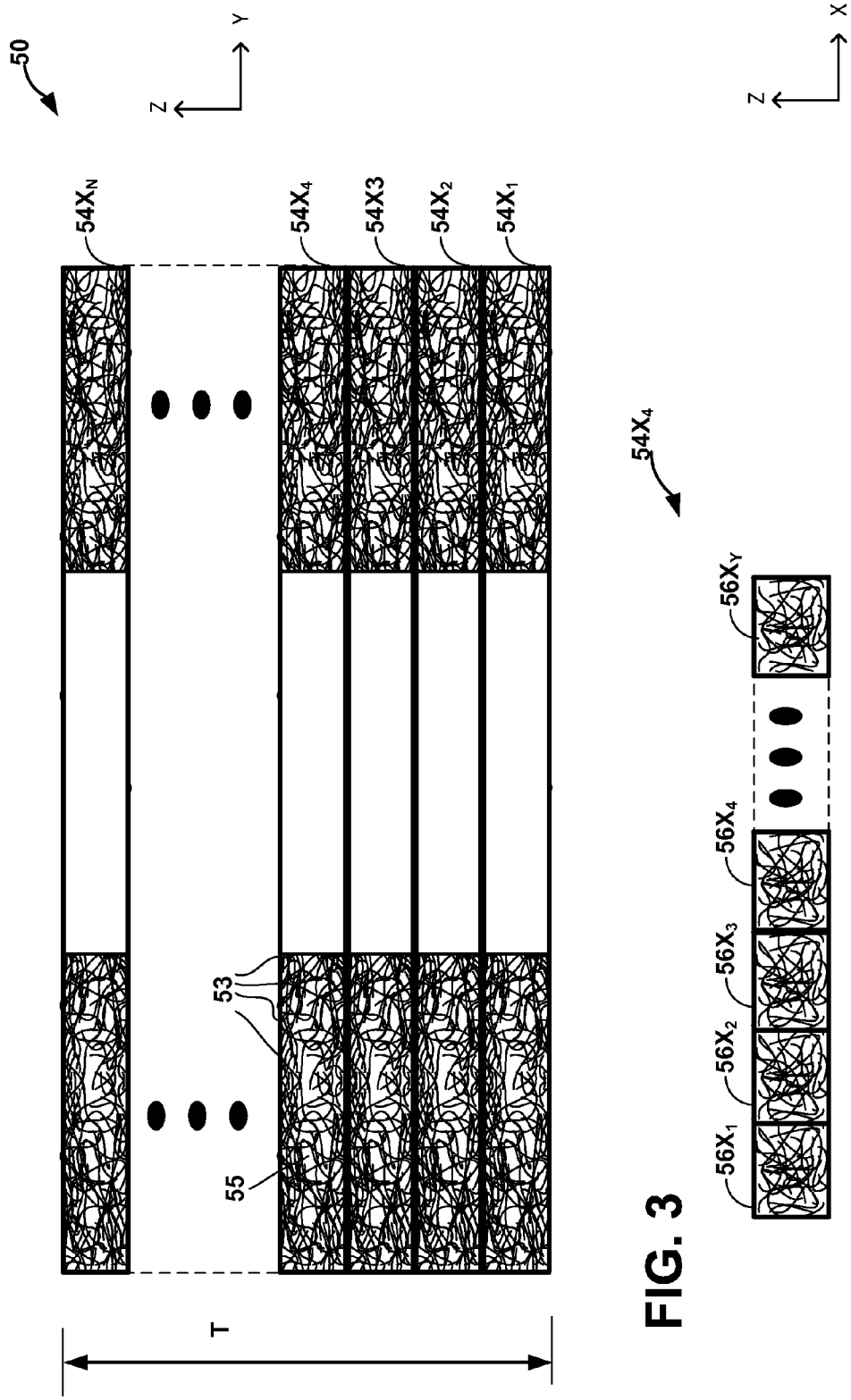

METHOD OF MAKING CARBON FIBER PREFORMS

TECHNICAL FIELD

The disclosure relates to carbon fiber preforms, e.g., as used to form carbon-carbon composite materials.

BACKGROUND

Carbon fiber-reinforced carbon materials, also referred to as carbon-carbon (C—C) composite materials, are composite materials that include carbon fibers reinforced in a matrix of carbon material. The C—C composite materials can be used in many high temperature applications. For example, the aerospace industry employs C—C composite materials as friction materials for commercial and military aircraft, such as brake friction materials.

SUMMARY

Devices, systems, and techniques for forming a carbon fiber preform are described. Example a carbon fiber preforms and carbon-carbon composite components resulting from the techniques are also described. In some examples, carbon fiber preforms may include a plurality of individual layers, each layer comprising a plurality of carbon fibers and a mixture including a resin and an additive powder. The mixture including the resin and the additive powder may deposited by a print head of a three-dimensional printing system. For example, the mixture may be deposited via the print head on a layer carbon fibers to form an individual layer of the carbon fiber perform. Additionally or alternatively, the mixture and the carbon fibers may be deposited together via the print head, e.g., as a composite material including a plurality carbon fiber mixed with the resin and additive powder or as a plurality of carbon fibers coated with the mixture of resin and additive powder.

In total, the individual layers may form a carbon fiber preform which may be densified, e.g., via chemical vapor infiltration (CVI)/chemical vapor deposition (CVD), and or resin densification, to form a densified carbon-carbon composite material. The additive powder deposited by the print head may be selected to provide for one or more desired properties of such a densified carbon-carbon composite material. For example, the additive powder in the carbon fiber preform may be selected to configured to at least one of prevent oxidation, modify a friction property, increase a density, or increase a strength of a densified carbon-carbon composite material formed from the carbon fiber preform.

In one aspect, the disclosure is directed to a method that includes depositing a mixture including a resin and an additive powder via a print head of a three-dimensional printing system to form a carbon fiber preform including a plurality of individual carbon fiber layers, wherein each individual layer of the plurality of individual carbon fiber layers includes a plurality of carbon fibers and the mixture of the resin and the additive powder.

In another aspect, the disclosure is directed to a carbon fiber preform comprising a plurality of individual carbon fiber layers, wherein each individual layer of the plurality of individual layers includes a plurality of carbon fibers and a mixture of resin and additive powder.

In another aspect, the disclosure is directed to a system comprising a print head configured to deposit a mixture including a resin and an additive powder; and a controller configured to control deposition of the mixture to form a carbon fiber preform including a plurality of individual carbon fiber layers, wherein each individual layer of the plurality of individual carbon fiber layers includes a plurality of carbon fibers and the mixture of the resin and the additive powder.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 2-4 are conceptual diagrams illustrating an example carbon fiber preform in accordance with aspects of the disclosure.

DETAILED DESCRIPTION

Figure 1:
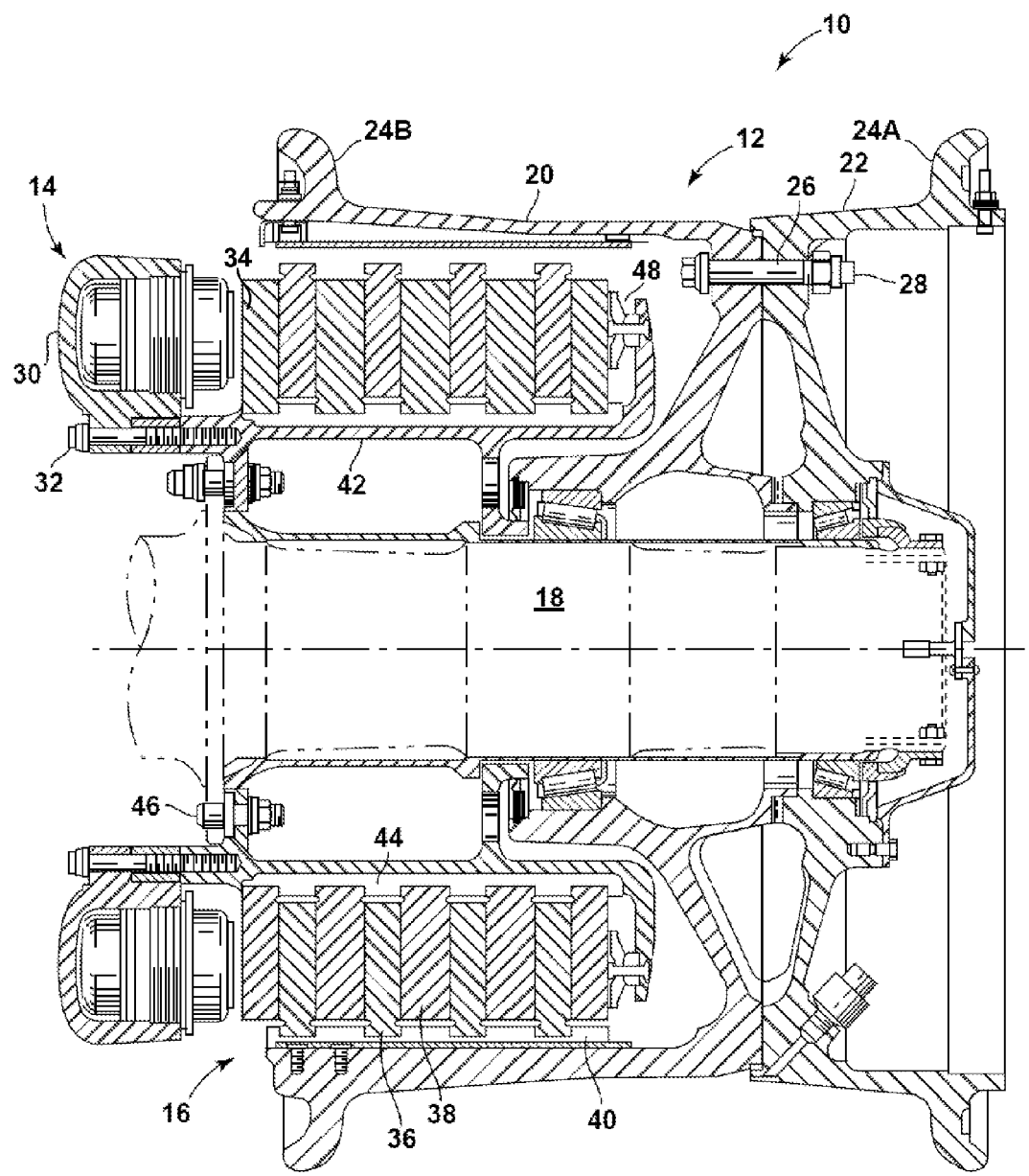
FIG. 1 is a schematic block diagram illustrating an example aircraft brake assembly.

Example techniques for forming a carbon fiber preform are described herein, along with carbon-carbon composite materials and structures formed from the carbon fiber preform. Densified C—C composite materials used, for example, in aerospace applications such as brake discs, may be formed from carbon fiber preforms that have been densified using a variety of densification techniques. For example, a carbon fiber preform may be formed by layering fabric sheets formed of woven or nonwoven carbon fiber, which may be then be densified by infiltrating the preform with liquid pitch using vacuum pressure infiltration (VPI) and/or resin transfer molding (RTM) followed by carbonization of the pitch to achieve a C—C composite material exhibiting a desired final density. Additionally or alternatively, CVI/CVD may be used to densify the fabric preform or another carbon preform. In the case of an aircraft brake pad, in some examples, the carbonized preform may take the form of an annular ring, although other shapes may also be used in other examples.

In accordance with one or more examples of the disclosure, a carbon fiber preform may include a plurality of individual layers, each layer being formed of carbon fibers and a mixture of resin (e.g., pitch) and an additive powder. The mixture of resin and additive powder may be deposited via a print head of a three-dimensional printing system. Using the three-dimensional printing system, the individual layers may be sequentially formed on a layer-by-layer basis in three-dimensions to generate a preform with, e.g., a desired geometry. The three-dimensional position of the print head in may be under automated control during the process such that the location at which the mixture of resin and additive powder deposited can be controlled to define a multilayer carbon fiber preform with a desired geometry and desired distribution of additive powder in the preform.

The additive powder may be selected to influence one or more properties of a densified carbon-carbon composite material formed from the preform. For example, the additive powder may be selected to at least one of prevent oxidation, modify a friction property, increase a density, or increase a strength of a densified carbon-carbon composite material formed from the carbon fiber preform. By controlling the distribution of the selected additive powder by depositing the mixture of resin and additive powder via a three-dimensional printing process, the properties of a densified carbon-carbon composite material formed from such a carbon fiber preform may be tailored, e.g., based on the particular application for the densified carbon fiber preform.

In some examples, mixture of resin and additive powder may be deposited in a melted state (a melted composite material) via a print head (e.g., either onto an existing layer of carbon fibers or with the carbon fibers mixed with the resin and additive powder), which then solidifies to form a respective layer, followed by the deposition of additional mixture of resin and additive powder on the respective layer to form an additional layer. In other examples, individual layers of a carbon fiber preform may be formed by depositing, via a print head of a three-dimensional printing system, a plurality of individual carbon fibers each coated with the mixture of resin and additive powder. In some examples, the three-dimensional printing system may employ a pultrusion process to coat a substantially continuous (e.g., continuous) carbon fiber filament with the resin and additive powder, and then cut the coated filament into individual carbon fibers coated with the resin. The carbon fiber preform generated via the process may then be carbonized and densified to generate a densified carbon-carbon composite material, such as, e.g., a carbon brake disc.

Examples of the disclosure may allow for one or more advantages. For example, in some instances, by utilizing a three-dimensional printing process to form a carbon fiber preform by depositing a mixture of resin and additive powder, a carbon fiber preform may be used to manufacture composite materials with significantly higher density and/or heat capacity at shorter time and lower cost than other types of composite materials, such as, e.g., those composites material formed from preforms manufactured without three-dimensional printing of such as resin mixture. As another example, the three-dimensional printing process allows for variation in proportion and composition of additive powders throughout a carbon fiber preform, e.g., to engineer composite materials with targeted properties where those properties are needed and/or desired.

FIG. 1 is a conceptual diagram illustrating an example assembly 10 that may include one or more C—C composite material components formed in accordance with the techniques of this disclosure. For ease of description, examples of the disclosure will be described primarily with regard to aircraft brake discs formed of C—C composite materials. However, the C—C composite materials and carbon fiber preforms of this disclosure may be used to form parts other than aircraft brake discs. For example, the C—C composite material may be used a friction material in other types of braking applications, as well as in other applications such as, e.g., heat exchangers and heat shields.

In the example of FIG. 1, aircraft brake assembly 10 includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor discs 36 and stator discs 38; rotor discs 36 are configured to move relative to stator discs 38. Rotor discs 36 are mounted to wheel 12, and in particular wheel hub 20, by beam keys 40. Stator discs 38 are mounted to axle 18, and in particular torque tube 42, by splines 44. Wheel assembly 10 may support any variety of private, commercial, or military aircraft.

Wheel assembly 10 includes wheel 18, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seats 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seats 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Wheel assembly 10 is configured to provide a braking function to an aircraft via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor discs 36 and stator discs 38. Rotor discs 36 are mounted to wheel hub 20 for common rotation by beam keys 40. Stator discs 38 are mounted to torque tube 42 by splines 44. In the example of FIG. 1, brake stack 16 includes four rotors and five stators. However, a different number of rotors and/or stators may be included in brake stack 16 in other examples. Further, the relative positions of the rotors and stators may be reverse, e.g., such that rotor discs 36 are mounted to torque tube 42 and stator discs 38 are mounted to wheel hub 20.

Rotor discs 36 and stator discs 38 may provide opposing friction surfaces for braking an aircraft. As kinetic energy of a moving aircraft is transferred into thermal energy in brake stack 16, temperatures may rapidly increase in brake stack 16, e.g., beyond 200 degrees Celsius. With some aircraft, emergency braking (e.g., rejected takeoff) may result in temperatures in excess of 500 degrees Celsius, and in some cases, even beyond 800 degrees Celsius. As such, rotor discs 36 and stator discs 38 that form brake stack 16 may include robust, thermally stable materials capable of operating at such temperatures.

Figure 6:
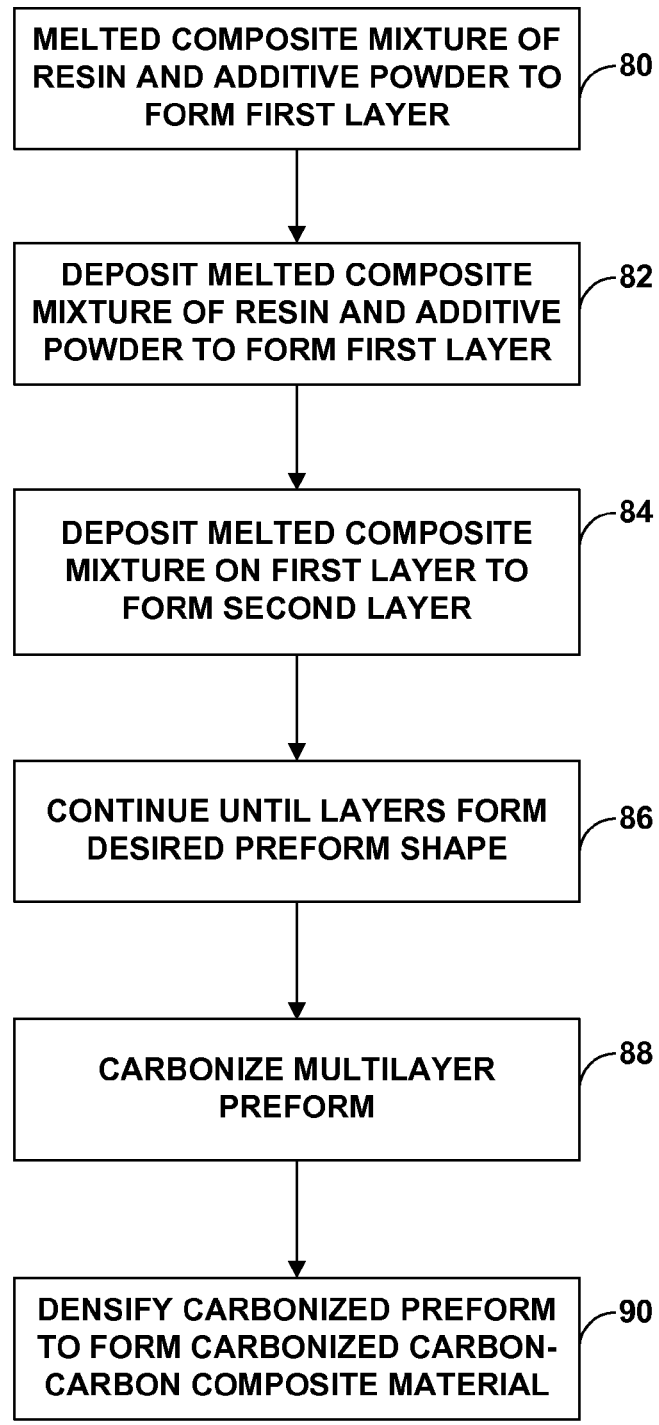
FIG. 6 is a flow diagram illustrating an example method of forming an example carbon fiber preform and a densified carbon-carbon composite material from the carbon fiber preform.

In one example, rotor discs 36 and/or stator discs 38 are formed of a C—C composite material fabricated according to one or more example techniques of this disclosure (e.g., the technique described with respect to FIG. 6). In particular, at least one of rotor discs 36 and/or at least one of stator discs 38 may be formed from densified C—C material fabricated from a carbon fiber preform generated via one or more of the example techniques of this disclosure. Rotor discs 36 and stator discs 38 may be formed of the same materials or different materials. For example, wheel assembly 10 may include metal rotor discs 36 and C—C composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As briefly noted, in some examples, rotor discs 36 and stator discs 38 may be mounted in wheel assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor discs 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. Splines 44 may, for example, be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. Accordingly, in some examples, example techniques of the disclosure may be used to form a beam key and/or spline for wheel assembly 10.

The example assembly 10 shown in FIG. 1 is merely one example. In other examples, assembly 10 and the components of assembly 10 (e.g., wheel 10, actuator assembly 14, brake stack 16, and axle 18) may have another suitable configuration. In addition, in other examples, the C—C composite materials described herein resulting from example carbon fiber preforms may be used to form other structures in addition to, or instead of, one or more of discs 36, 38, keys 40, and spline 44.

Figure 2:
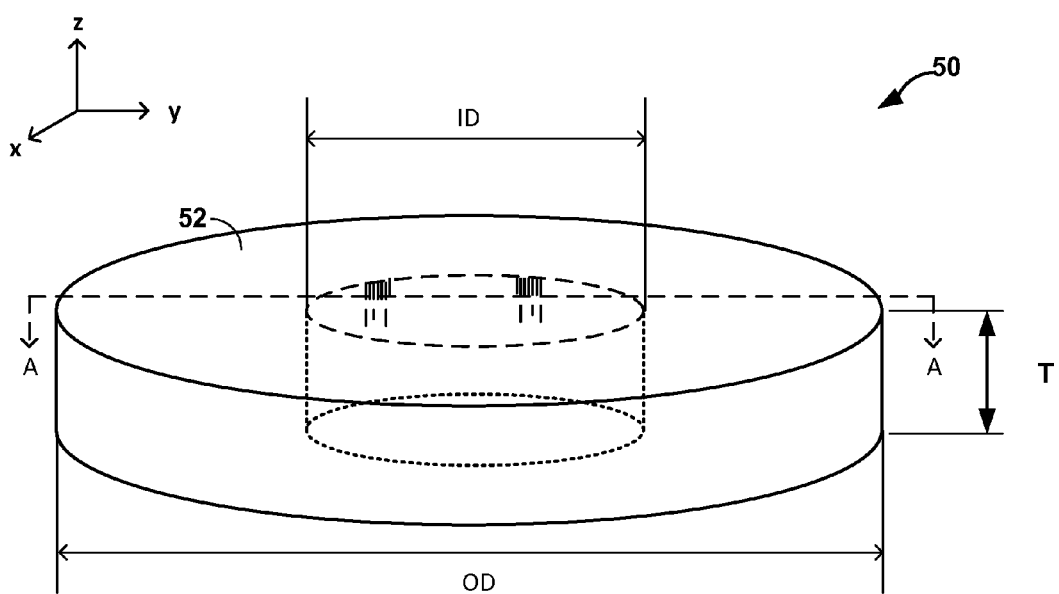

FIG. 2 is a conceptual diagram illustrating example carbon fiber preform 50 in accordance with aspects of the disclosure. As shown, preform 50 is an annular ring with an inner diameter (ID), outer diameter (OD), and a thickness (T) in the z-axis direction (orthogonal x-y-z axes are shown in FIG. 2 for ease of description). Carbon fiber preform 50 is defined by substrate 52, and includes a plurality of individual layers extending in approximately the x-y plane (not shown in FIG. 2) including carbon fibers and a composite mixture including an additive powder mixed in a resin. The composite mixture may be deposited via a print head of a three-dimensional printing device. In some examples, preform may have an inner diameter (ID) of about 4 inches (about 10.16 cm) to about 18 inches (about 45.72 cm), and outer diameter (OD) of about 10 inches (about 25.4 cm) to 30 inches (about 76.2 cm), and a thickness (T) of about 0.5 inches (about 1.27 cm) to about 2.5 inches (about 6.35 cm). Other ranges and geometries are contemplated.

FIG. 3 is a schematic diagram illustrating preform 50 taking along cross-section A-A indicated in FIG. 2. As shown, preform 50 includes a plurality of individual layer $54X_1$, $54X_2$, $54X_3$, $54X_4$, . . . and $54X_n$, where n is the total number of individual layers in the z-axis direction. The layers will be collectively referred to as layers 54. In total, these individual layers define the thickness, T, of preform 50 in the z-axis direction. Each individual layer is formed of plurality of carbon fibers 53 and composite mixture 55. The thickness of the individual layers 54 may be dependent on the design intent of the composite material for a given application. In some examples, the thickness of the individual layers may be between approximately 25 mils (approximately 0.635 millimeters (mm)) and approximately 125 mils (approximately 3.175 mm), although other thicknesses are contemplated. In some examples, the overall thickness, T, of preform 50 may be between approximately 0.5 inches (approximately 1.27 centimeters (cm)) to approximately 2.5 inches (approximately 6.35 cm), although other thicknesses are contemplated.

FIG. 4 is a schematic diagram illustrating a cross-section of layer $54X_4$ of preform 50 in the x-direction, which is representative of the configuration of each of the respective individual layers 54 of preform 50. As shown, layer $54X_4$ includes a plurality of individual rows $56X_1$, $56X_2$, $56X_3$, $56X_4$, . . . and $56X_y$ aligned side-by-side in the x-axis direction, where y is the total number of individual rows in the x-axis direction. Again, each individual row 56 includes plurality of carbon fibers 53 and composite mixture 55 deposited by a print head of a three-dimensional printing system. Rows 56 combine to form layer $54X_4$ in the x-y plane that also includes thickness in the z-axis direction.

Rows 56 may be deposited in any suitable configuration to form layer $54X_4$ in the x-y plane. For example, rows 56 may be linear rows formed in a grid pattern, concentric circles, e.g., from the ID to the OD of preform 50, or in a coiled pattern, e.g., from the ID to the OD of preform 50, which may allow for the continuous deposition of composite mixture 55 compared to a pattern of concentric circles. The individual rows 56 may have any suitable width and cross-ssectional shape, both of which may depend on the design of the three-dimensional (3D) print head and may be selected based on the design intent of the composite material formed from the preform. In some examples, the individual rows may have a substantially circular, oval, rectangular, triangular or other suitably shaped cross-section and may have a width of approximately 5/16 of an inch (approximately 7.9375 millimeters (mm)) to approximately 1/8 of an inch (approximately 3.175 mm). Rows 56 may be uniform in at least one dimension in some examples, while in other examples, at least two rows 56 may have a different configuration from each other (e.g., a different width, measured in the x-axis direction).

As described, preform 50 may include plurality of carbon fibers 53. Any suitable carbon fiber may be used, such as, e.g., polyacrylonitrile (PAN) fibers, pitch fibers, oxidized PAN, carbon fiber derived from PAN, carbon fiber derived from pitch, rayon, and the like. The carbon fibers may provide structural strength in the finished composite material. The carbon fibers may be a single filament or a carbon fiber tows. Length of fiber and fiber tows can vary from about 0.1 inch (about 2.54 millimeters) substantially continuous (e.g., continuous). Each carbon filament may be less than or equal to, e.g., about 20 microns (about in diameter. In some examples, the length of the fibers may be varied along the thickness, T, of the preform. For example, the fibers near an outer surface of preform 50 may each have a length of approximately 0.25 inches (approximately 6.35 mm) while the fibers near the geometric middle of preform 50 may have a length of approximately 3 inches (approximately 7.62 cm) or less.

Composite mixture 55 includes resin mixed with one or more additive powders. Any suitable resin used for forming preform 50 may be used. For example, the resin may be a carbonizable resin or pitch material such that carbon is formed from the resin during a carbonization process. Example resin matrix materials include, but are not limited to, synthetic, coal tar, petroleum isotropic and mesophase pitch, phenolic resin, epoxy resin or other carbon yielding resins.

In some examples, the resin may include pitch. The pitch may be a hydrocarbon-rich material that may be extracted, e.g., from coal, tar, and petroleum. In some examples, the pitch may also be synthetically produced. In different examples, the pitch may come from a single source (e.g., coal) or may be a combination of different pitches from different sources. In some examples, the pitch may be a mesophase pitch. In other examples, the pitch may be an isotropic pitch. Combinations of mesophase and isotropic pitches are also contemplated.

Composite mixture 55 may also include an additive powder mixed in the resin. The additive powder may be selected and added to the resin such that a C—C composite material formed from preform 50 may exhibit one or more desirable properties. For example, the additive powder may result in the modification of one or more properties of a C—C composite material formed by carbonizing and densifying preform 50 (e.g., via CVI/CVD), as compared to the properties that would be exhibited by preform 50 without the inclusion of additive powder in composite mixture. For example, the additive powder may help prevent oxidation (e.g., reduce oxidation), modify a friction property, increase the density, or increase the strength of a densified carbon-carbon composite material formed from the carbon fiber preform.

In some examples, the additive powder in composite mixture 55 may include carbon-based powders and/or ceramic powders. Example carbon powders in composite mixture 55 may include, but are not limited to, at least one of activated carbon powder, graphite powder, or carbon black powder, which are substantially pure carbon powders that may differ by carbon form, particle size and/or particle surface properties. Example ceramic powders in composite mixture 55 may include, but are not limited to, silicon carbide powder, titanium carbide powder, tungsten carbide powder, titanium nitride powder, boron nitride powder and the like. In some examples, the ceramic powder may be formed relatively hard and substantially chemically non-reactive ceramic materials with high melting point (e.g., greater than or equal to about approximately 2,700 degrees Celsius) may be used. In some examples, the additive powder may include ceramic precursor powder(s), such as, e.g., silica powder or a stochiometric mixture of silica powder and carbon powder. In some examples, the advantage of using precursors is that after the preform is manufactured via the three-dimensional printing process, the preformed may be heat treated to convert the precursor to ceramic, resulting in a strong and substantially uniformly distributed ceramic matrix.

The additive powder may exhibit any suitable particle size to provide for the desired property of a C—C composite material formed from preform 50. In some examples, the additive powder may have a particle size from approximately 1 micron to approximately 100 microns. The additive powder particle size may differ depending on the type of material being utilized as the powder (e.g., type of carbon or ceramic material). The powder particle size the powder may be selected based on the desired properties of the finished composite material formed from the preform as well as processing requirements of the 3D printing process. For example, smaller particle sizes may be preferred in cases because as the smaller particles may mix better with liquid pitches and resins and also distribute more uniformly within the matrix compared to larger particles.

The amount and/or type of additive powder in composite mixture may be selected based on the property desired in a C—C composite material formed from preform 55. Additionally, the relative concentration of the additive powder contained in preform 50 and C—C composite material formed therefrom, may be tailored to provide for a desired property. For example, the concentration of the additive powder may be substantially uniform throughout preform 50 or may vary. In some examples, the concentration of the additive powder may vary on a layer between individual carbon fiber layers 54. For example, the concentration of the additive powder individual layer $54X_1$ may be less than or greater than the concentration of the additive powder in one more of individual layers $54X_2$, $54X_3$, $54X_4$, . . . and $54X_n$. Additionally or alternatively, the concentration of the additive powder may vary within individual layers 54. For example, individual layer $54X_1$ may include a higher or lower concentration of additive powder in individual rows $56X_1$ compared to one or more of individual rows $56X_2$, $56X_3$, $56X_4$, . . . and $56X_y$. The concentration of the additive powder throughout preform 50 may be tailored, e.g., by controlling the amount of additive powder in composite mixture 55 deposited via the print head of three-dimensional printing system, e.g., as described below.

In some examples, composite mixture 55 may include a ceramic powder mixed with the resin to modify the oxidation properties to help prevent, e.g., reduce, oxidation at one or more portions of a C—C composite component formed from preform 50. In some examples, the type of oxidation prevented by the additive powder may include catalytic oxidation. In some examples, to prevent oxidation, the ceramic powder may be included only in (or in an increased amount relative to other portions) the outer (surface) portion of preform 50. For example, the concentration of the ceramic powder may be greater at or near the top and bottom surfaces of preform 50 and the ID and the OD and ID surfaces of preform 50, e.g., compared to those regions nearer the middle of preform 50, where oxidation is not as much of a concern compared to the outer surface portions of a C—C composite material, e.g., brake disc, formed from preform 50 during high temperature operation of the composite material. In one example, the ceramic powder may include titanium carbide (or other ceramic powder) which, if applied near the surface of carbon composite, may adhere to the carbon substrate and create a layer separating carbon from air, thus providing oxidation protection to the composite material.

Additionally or alternatively, composite mixture 55 may include a carbon powder (e.g., graphite powder) and/or ceramic powder (silicon carbide or titanium carbide) mixed with the resin to modify one or more friction properties a C—C composite component formed from preform 50. In some examples, such an additive may be included only (or in an increased amount relative to other portions) portion(s) of preform 50 that are near the friction surface of a C—C composite material formed from preform 50. Friction surface regions (also referred to as working surface regions) generally correspond to the surface portions of a brake disc or other frictional component that, unlike non-friction surface regions, frictionally engages with an opposing brake disc or other opposing friction component during a braking operation. In the case of a C—C composite brake disc formed from preform 50, the friction surface regions may correspond to the outer faces of the annular ring, and the non-friction surface regions 54 may correspond to the outer perimeter (or OD) surface region and inner perimeter (or ID) regions, e.g., lug regions.

In such cases, the concentration of the carbon and/or ceramic powder may be greater at or near the top and bottom surfaces of preform 50, as compared to the ID and the OD surface as well as those regions nearer the middle of preform 50. By employing an additive powder in composite mixture 55 to modify one or more frictional properties as described may increase the uniformity of the frictional surfaces, e.g., by increasing the uniformity of the wear rates across the frictional surfaces. In some examples, the additive powder may cause the wear rate of the frictional surfaces to be less dependent on temperature. For example, the difference between wear rates of the friction surfaces at low operating temperature versus high operating temperatures of a C—C composite material formed from preform 50 may be less than a C—C composite material formed from a preform without the additive powder of composite mixture 50.

Additionally or alternatively, composite mixture 55 may include a ceramic powder (silicon carbide or titanium carbide) mixed with the resin to increase the density of a C—C composite component formed from preform 50, e.g., as compared to a C—C composite material formed from a preform without such an additive powder in composite mixture 50. In some example, the increase in density may refer to the overall density of the material, compared to achieving the same density of another C—C composite material in a shorter time (e.g., fewer CVD/CVI cycles). For example, density of titanium carbide may be about 4.93 grams/cubic centimeter (g/cc) and density of a C—C composite (without the additive powder) may be about 1.8 g/cc. In such a case, with about 20% titanium carbide loading in the composite, the final density may be as high as about 2.4 g/cc (an increase of about 33%). Since the specific heats of each material are comparable, the density increase translates directly into heat capacity increase. As such, the ceramic powder used in such examples may be a ceramic that does not melt at the operating temperatures of a brake disc (such as, e.g., approximately 1500 degrees Celsius or higher) formed of the C—C composite material and does not react with carbon.

By increasing the density in such a manner, the heat capacity of a C—C composite material formed from preform 50 may be increased, e.g., by greater than or equal to approximately 3 kiloJoule/Kelvin (kJ/K) or greater than or equal to approximately 5 kJ/K as compared to a C—C composite material formed from a preform without the additive powder. The increase in heat capacity would lower the overall temperature of the C—C composite material during operation. In some examples, the additive powder may be present in some amount throughout preform 50 but may be increased in concentration nearer the center of the preform compared to those portions nearer the outer surface of preform 50.

In some examples, the density may be increased by greater than or equal to approximately 10 percent, such as, e.g., greater than approximately 25 percent for a C—C composite component formed from preform as compared to a C—C composite material formed from a preform without such an additive powder in composite mixture 50.

Additionally or alternatively, the additive powder of composite mixture 55 may include a carbon powder (e.g., activated carbon and/or carbon black powder) mixed with the resin to increase the strength of a C—C composite component formed from preform 50, e.g., as compared to a C—C composite component formed from a preform without such an additive powder in composite mixture 50. For example, the addition of such a carbon powder may increase the strength of the C—C composite material by at least increasing the strength of the bond between carbon fibers 53 and the resin in composite mixture 55 of preform 50. In some examples, carbon fibers 53 may shrink at different rates than the pyrolized resin in composite mixture 55, e.g., during heat treatment of preform 50, thus resulting in microcracks in the bulk material. However, the increased surface area of the carbon powder (e.g., an activated carbon powder) may draw in an increased amount of resin. Thus, the pyrolized resin will not form as many, if any, microcracks because the pyrolized resin is not able to separate from carbon fibers 53 during heat treatment, compared to examples in which the carbon powder is not added.

In some examples, the purpose of heat treatment may be to graphitize carbon as graphitic carbon may have more desirable friction properties than non-graphitic carbon. Activated carbon particles/powder (e.g., generated via high temperature gas treatment or chemical treatment of carbon) may have relatively large surface area compared to their volume. Therefore, the carbon particles may attract and bond to many resin molecules in the vicinity. As the pyrolytic resin tries to shrink during heat treat, the relatively strong bonds between the pyrolytic resin and activated carbon particles may help reduce (e.g., help prevent or prevent) the amount of shrinkage of the resin. In addition, relatively strong stress fields may be created between adjacent activated carbon particles. Those stress fields may have a tendency to reorient carbon molecules in pyrolized resin. This stress induced reorientation is called "stress graphitization" because it results in more graphitic pyrolized resin structure, which may be advantageous for friction properties.

Preform 50 may include any suitable amount of the additive powder in composite mixture 55 as deposited via a print head of a three-dimensional printing system that allows for preform 50 to function as described herein. In some examples, composite mixture 55 may include approximately 0.1 to approximately 50 weight percent (wt %) of the additive powder, such as, e.g., approximately 25 to approximately 40 wt %, or approximately 1 to approximately 5 wt % of the additive powder. In some examples, the balance of the composite may comprise, consist of, or consist essentially of the resin. In some examples, composite mixture may include approximately 99.9 to approximately 50 wt % of the resin, such as, e.g., approximately 75 to approximately 60 wt % or approximately 99 to approximately 95 wt % of the resin.

Any suitable system and techniques may employed to deposit composite mixture 55 via a print head of a 3D printing system to generate preform 50 and C—C composite material form therefrom. Described further below are examples of systems and technique that may be employed. However, other examples and system are contemplated. In some examples, one or more of the 3D printing systems and techniques for forming a carbon fiber preform and densified C—C composite material (e.g., a C—C composite brake disc) described in U.S. patent application Ser. Nos. 14/711,550, 14/711,508, and 14/711,590, each filed May 13, 2015, may be employed to form one or more example preforms and C—C composite materials including an additive material, as described herein. The entire content of each of these applications is incorporated by reference herein.

In some examples, mixture of resin and additive powder may be deposited in a melted state (a melted composite material) via a print head (e.g., either onto an existing layer of carbon fibers and/or with the carbon fibers mixed with the resin and additive powder), which then solidifies to form a respective layer (or portion of a layer in the form of a row, for example), followed by the deposition of additional composite mixture 55 including resin and additive powder on the respective layer to form an additional layer including carbon fibers and composite mixture.

In other examples, individual layers of a carbon fiber preform may be formed by depositing, via a print head of a three-dimensional printing system, a plurality of individual carbon fibers each coated with the mixture of resin and additive powder. In some examples, the three-dimensional printing system may employ a pultrusion process to coat a substantially continuous (e.g., continuous) carbon fiber filament with the resin and additive powder, and then cut the coated filament into individual carbon fibers coated with the resin.

The carbon fiber preform generated via either process may then be carbonized and densified to generate a densified carbon-carbon composite material, such as, e.g., a carbon brake disc. In some examples, individual layers of carbon fibers 53 and composite mixture 55 may be formed and densified on a layer by layer basis during the 3D printing process, e.g., rather than forming all layers of carbon fibers 53 and composite mixture 55 followed by the densification of those layer in total.

Figure 5:
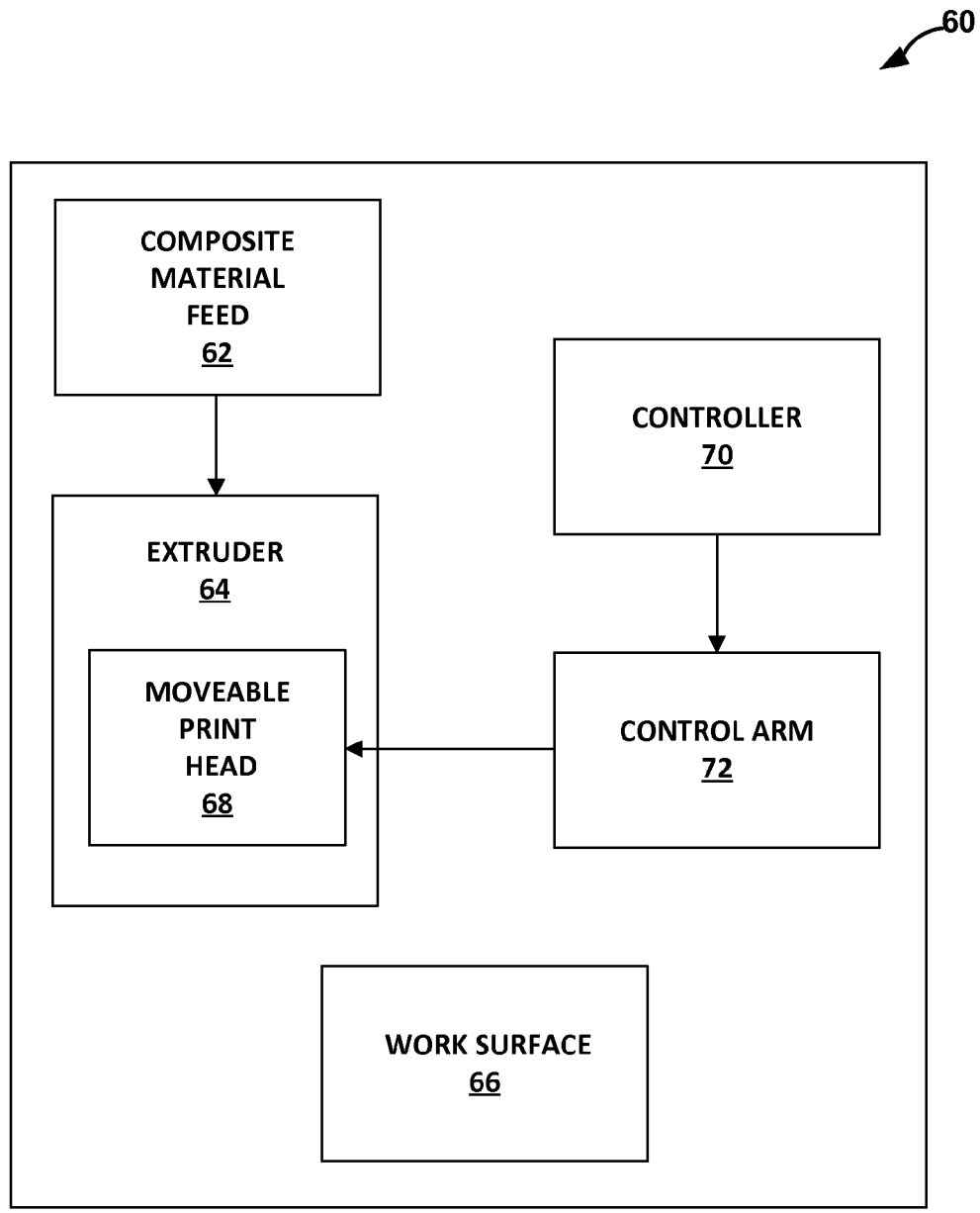
FIG. 5 is a schematic diagram illustrating an example three-dimensional printing system which may be used to manufacture the example preform of FIGS. 2-4.

FIG. 5 is a schematic diagram illustrating example three-dimensional printing system 60 which may be used. e.g., to form preform 50 via an additive manufacturing process. Any suitable system configured to deposit composite mixture 55 to form preform 50 using 3D printing or other additive manufacturing techniques may be used. For ease of description, system 60 is described in terms of an extrusion deposition system. However, other systems for forming preform 50 are contemplated.

As shown, system 60 includes composite mixture feed 62 which is configured to feed composite mixture 55 including resin and one or more additive powders to extruder 64. For example, composite mixture 55 may be in the form of prefabricated pellets or a coiled ring of prefabricated composite mixture 55. Composite mixture 55 may be heated by extruder 64 to a temperature that melts composite mixture 55 (e.g., to a liquid state or otherwise softens composite mixture 55) in a manner that allows the heated material to flow out of one or more outlets define by moveable printer head 68. The material flowing out of printer head 68 may be deposited on work surface 66, e.g., either directly or indirectly onto one or more layers of composite mixture 55 previously deposited. The deposited material may be allowed to cool to form a solid layer of resin mixed with additive powder, and the process may be repeated by adjusting the position of print head 68 in three-dimensions above work surface 66, which supports the deposited layers throughout the three-dimensional printing process. Composite mixture 55 may be deposited via print head 66 on a continuous or discontinuous basis during the printing process. In some examples, the melting and extrusion steps may be carried out in a cross head extrusion system.

As described above, in some example, composite mixture 55 may also include carbon fibers 53 mixed with the resin and one or more additive powders such that the deposition of composite mixture 55 via print head 68 may include the deposition of carbon fibers 53 along with the resin and additive powder(s). Alternatively or additionally, carbon fiber 53 of may be deposited separately from composite mixture 55. e.g., as prefabricated carbon fiber fabric segments.

In some examples, rather than feeding composite mixture 55 to extruder 64 as a mixture of resin and the additive powder(s), the resin and the additive powder(s) (and carbon fibers 53 in some examples) may be fed separately to extruder where the components are mixed with each other prior to being deposited via print head 68. For example, the one or more additive powders may be added to a melt stream of resin and distributed or otherwise mixed with each other in mixing section(s) of extruder 64 or twin rotation devices, followed by the deposition of composite mixture 55 via print head 68. In this manner, the composition of composite mixture 55 in terms of additive powder in the resin, as well as type of additive powder, may be controlled (e.g., varied or kept substantially constant) throughout the 3D printing process, e.g., to provide desired concentrations and types of additive powder within one of more portions of preform 50, e.g., as described above.

In the example illustrated in FIG. 5, system 60 includes controller 70, which may control operation of system 60 during the 3D printing process to provide preform 50 with a desired geometry and composition. For example, during deposition, controller 70 may control the movement of control arm 72, which is attached to moveable print head 68, to control the position of moveable print surface 66 relative to work surface 66. In this manner, controller 70 may control the relative position of moveable print head 66 relative composite mixture 55 exiting out of print head 68 to form individual layers 54 of preform 50, e.g., by depositing individual rows 56 of composite mixture 55, such that preform 50 exhibits a desirable three-dimensional geometry. Stepper motors or servo motors may be employed to move print head 68 and adjust the flow of composite mixture 55 out of print head 68. Controller 70 may be configured to control the position of controller arm 72 in order to move print head 66 in the x-axis and y-axis directions, and, in some examples, in the z-axis direction. Additionally, controller 70 may control one or more other factors of the additive deposition process, such as, e.g., temperature of composite mixture 55 at one more location within system 60, the timing of the feed of composite mixture 55 from feed 62 to extruder 64, the position of print head 68 and/or flow rate of resin out of print head 68. Additionally, controller 70 may control the composition of composite mixture 55 during deposition, e.g., to control the amount and/or type of additive powder(s) contained in composite mixture 55, to provide for a tailored amount of additive powder(s) within preform 50.

In some examples, controller 70 may include a microprocessor or multiple microprocessors capable of executing and/or outputting command signals in response to received and/or stored data. Controller 70 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Controller 70 may include computer-readable storage, such as read-only memories (ROM), random-access memories (RAM), and/or flash memories, or any other components for running an application and processing data for controlling operations associated with system 60. Thus, in some examples, controller 70 may include instructions and/or data stored as hardware, software, and/or firmware within the one or more memories, storage devices, and/or microprocessors. In some examples, controller may control print head 66 using a computer-aided manufacturing (CAM) software package running on a microcontroller. Controller 60 may include multiple controllers or only a single controller.

FIG. 6 is a flow diagram illustrating an example technique of forming preform 50 and, subsequently, a densified C—C composite material from preform 50 in accordance with aspects of the disclosure. For ease of illustration, the example of FIG. 6 is described as being performed via system 60 of FIG. 5. However, other systems suitable for carrying out the 3D printing of carbon preform 50 are contemplated.

As shown, under the control of controller 70, system 60 may cause composite mixture 55 including resin and the additive powder(s) to be heated by extruder 64 to melt composite material (80), e.g., to a state in which composite material 52 may flow out of print head 68. Initially, print head 68 deposits composite mixture 55, e.g., on a layer of carbon fibers formed in the x-y plane, to form a first layer of mixture 55, e.g., layer $54X_1$, on work surface 66 (82). Such a process may include forming individual rows (e.g., corresponding to rows 56 shown in FIG. 4 for layer $54X_4$), to form layer $54X_1$ of composite material in the x-y plane. Controller 70 may control the position of print head 68 throughout the process to provide for a desired layer geometry.

After composite mixture 55 of layer $56X_1$ has cooled to solidify the layer, under the control of controller 70, print head 68 deposits composite mixture 55 to form a second layer of composite material 52 (layer $54X_2$) on first layer $54X_1$ (84). This process more be repeated to form layers $54X_1$, $54X_2$, $54X_3$, $54X_4$, . . . , and $54X_n$ of preform 50 (86). Again, controller 70 may control the position of print head 68 in three-dimensions, among others, throughout the deposition process such that the combination of layers $54X_1$, $54X_2$, $54X_3$, $54X_4$, . . . , and $54X_n$ of composite mixture 55 form preform 50 with a desired three-dimensional geometry.

Subsequently, multilayer carbon fiber preform 50 may be carbonized by heating temperature of preform 50 to approximately 550 degrees Celsius to approximately 2450 degrees Celsius. During the carbonization process, pyrolysis of the resin and fiber components occurs, and higher molecular weight components are broken down to various gases and carbon. Carbon remains in the carbonized component while the gases are substantially eliminated (e.g., eliminated or nearly eliminated).

Following carbonization of multilayer preform 50 (88), the carbonized preform may be densified with carbonaceous material using chemical vapor deposition (CVD)/chemical vapor infiltration (CVI) (90). For example, the carbonized preform may undergo one or more cycles of CVD/CVI to fill voids in preform 50 resulting from gas evolution during the carbonization processes. The carbonized preform may undergo one or more cycles of CVD/CVI until the material exhibits a desired density. For example, such a material may exhibit a density greater than 1.70 grams per cubic centimeter (g/cc), e.g., between approximately 1.75 g/cc and approximately 1.90 g/cc.

In some examples of CVD/CVI, the carbonized preform is heated in a retort under the cover of inert gas, such as at a pressure below 100 torr. When the carbonized preform reaches a temperature between about 900 degrees Celsius and about 1200 degrees Celsius, the inert gas is replaced with a carbon-bearing gas such as natural gas, methane, ethane, propane, butane, propylene, or acetylene, or a combination of at least two of these gases. When the carbon-bearing gas flows around and through the carbonized preform, a complex set of dehydrogenation, condensation, and polymerization reactions occur, thereby depositing the carbon atoms within the interior and onto the surface of the carbonized preform. Over time, as more and more of the carbon atoms are deposited onto the surfaces of pores in the carbonized preform, the carbonized preform becomes denser. This process may be referred to as densification, because the open spaces in the carbonized preform are eventually filled with a carbon matrix until generally solid carbon parts are formed. U.S. Patent Application Publication No. 2006/0046059 (Arico et al.), the entire disclosure of which is incorporated herein by reference, provides an overview of example CVD/CVI processing that can be used with the techniques described herein. In other examples, other techniques may be used to densify preform 50.

Figure 7:
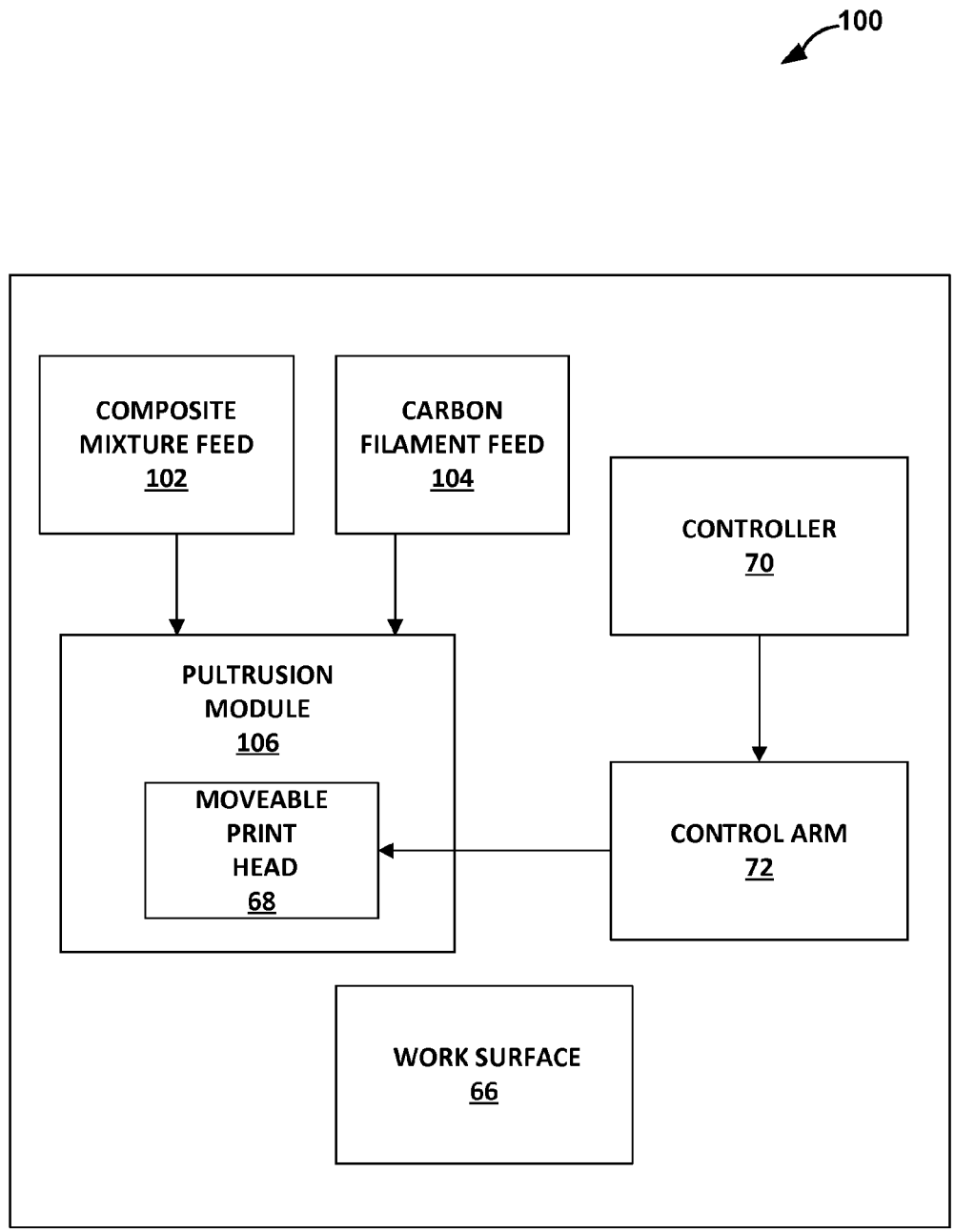
FIG. 7 is a schematic diagram illustrating another example three-dimensional printing system which may be used to manufacture the example preform of FIGS. 2-4.

As described above, in some examples, rather depositing a composite material including carbon fibers mixed in a resin material and additive material(s), individual layers of a carbon fiber preform may be formed by depositing, via print head 68 of three-dimensional printing system 60, a plurality of individual carbon fibers each coated with a resin and one or more additive materials. FIG. 7 is a schematic diagram illustrating another example 3D printing system 100 which may be used, e.g., to form preform 50 by depositing a plurality of individual fibers, where each fiber is coated with composite mixture 55 including resin mixed one or more additive powders. Three-dimensional printing system 100 includes work surface 66, moveable print head 68, controller 70, and control arm 72 which function substantially the same or similar to that described with regard to system 60 (FIG. 4).

However, unlike that of system 60 (FIG. 4), system 100 includes composite mixture feed 102, carbon filament feed 104, and pultrusion module 106. Composite mixture feed 102 includes composite mixture 55, which includes a mixture of resin and the additive powder(s). In such a configuration, under the control of controller 70, system 100 may be configured to coat a substantially continuous (e.g., continuous) carbon filament from feed 104 with composite mixture 55 from feed 102 using pultrusion module 106. Once coated, module 106 may cut the substantially continuous (e.g., continuous) carbon filament into individual carbon fibers coated with composite mixture 55, which may be deposited via print head 68 directly or indirectly on work surface 66 to form layer of carbon fibers coated with composite mixture 55. The substantially continuous (e.g., continuous) coated carbon filament may be cut by system 60 before or after exiting print head 68.

Figure 8:
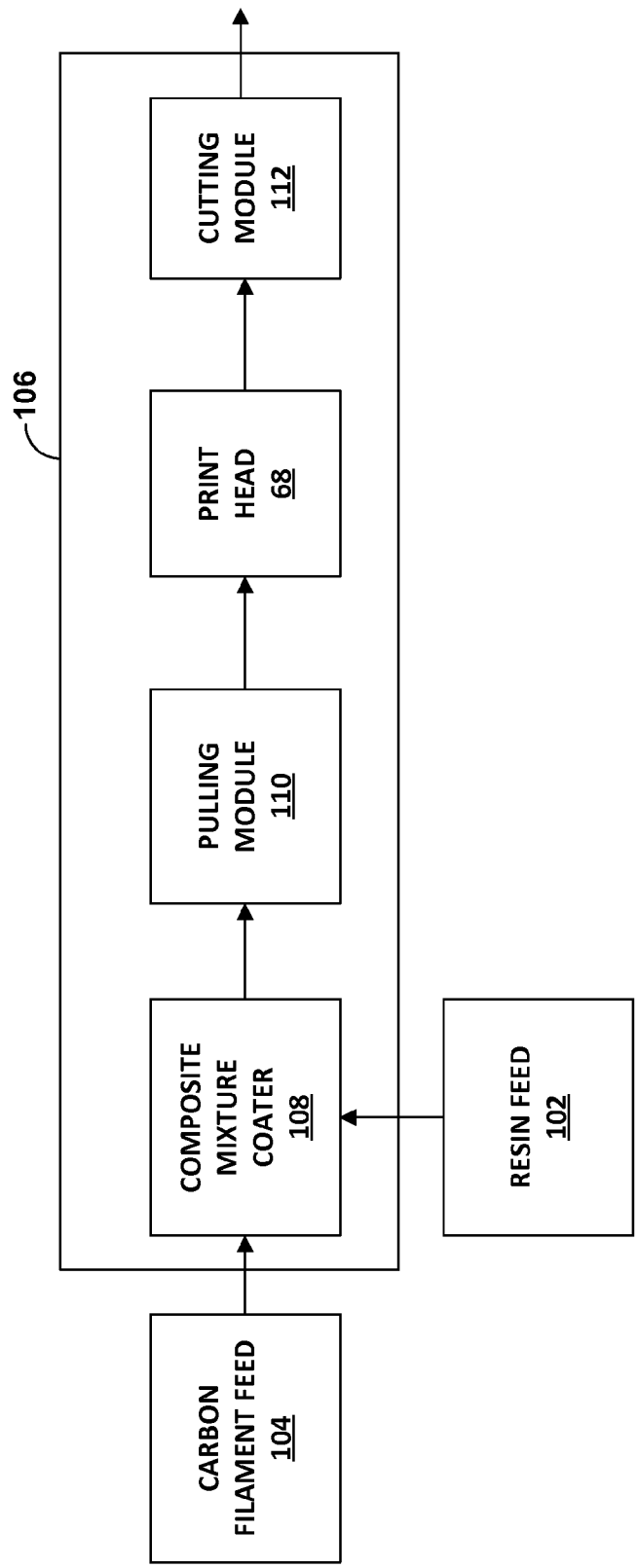
FIG. 8 is a schematic diagram illustrating an example pultrusion module that may be used in the three-dimensional printing system of FIG. 7.

FIG. 8 is a schematic diagram illustrating various aspects of an example pultrusion module 106 as incorporated in system 100 to coat a continuous carbon filament with composite mixture 55, which is then cut into individual coated carbon fibers. As shown, a substantially continuous (e.g., continuous) carbon filament is fed from carbon filament feed 104 through composite mixture coater 108, which includes composite mixture 55. The substantially continuous (e.g., continuous) carbon filament from carbon filament feed 104 may be an individual filament or a tow of carbon filaments, e.g., coiled on a roller. Rather than "pushing" the continuous carbon filament through resin coater 108, pulling module 110 "pulls" the carbon filament from the carbon filament fee 104 through composite mixture coater 108. Pulling module 110 may employ one or more suitable mechanisms for pulling the carbon filament through resin coater 108, such as, e.g., caterpillar puller or reciprocating pullers.

While passing through composite mixture coater 108, the continuous carbon filament is coated with composite mixture 55 supplied from composite mixture feed 102. For example, coater 108 may to take the form of a resin bath filled with liquid resin from composite mixture feed 102. Pulling module 110 pulls the continuous carbon filament from feed 104 through liquid composite mixture 55 in the bath, e.g., to coat the outside of the filament with composite mixture. After exiting the resin coater 108, the substantially continuous (e.g., continuous) carbon filament may have a coating of composite mixture 55 exhibiting any suitable thickness. The composite mixture 55 on the substantially continuous (e.g., continuous) carbon filament may be cooled, e.g., via air quenching, to solidify or reduce the viscosity of the resin coating.

Subsequent to coating, pulling module 110 feeds coated carbon filament to print head 68. Upon exiting print head 68, cutting module 112 cuts/chops the substantially continuous (e.g., continuous) carbon filament into individual carbon fibers coated with composite mixture 55, which are then deposited onto work surface 66 via print head 68. Cutting module 112 can include any suitable carbon fiber cutting/chopping technique, such as, e.g., a fiber chopper with a cutting wheel. The fibers may be cut to any suitable length. For example, the substantially continuous (e.g., continuous) coated fiber may be cut into individually coated carbon fibers with a length of approximately 1/16 of an inch (approximately 1.5875 mm) to approximately 3 inches (approximately 7.62 cm), e.g., approximately 1/8 of an inch (approximately 3.175 mm) to approximately 3 inches (approximately 7.62 cm). The thickness of the coating relative the diameter of the carbon fiber may be selected to provide for the compositional ranges of the composite mixture 55 and carbon fibers for the layers described above.

System 100 is only one example of a three-dimensional printing system that may be used to deposit coated carbon fibers to form, e.g., carbon fiber preform 50. In the described example, system 100 is configured to both coat a substantially continuous (e.g., continuous) carbon filament and cut the filament into individual coated carbon fibers. In other example, a three-dimensional printing may be configured to receive pre-coated, substantially continuous (e.g., continuous) carbon filaments, which are then cut and subsequently deposited via print head 68. In other examples, the carbon fibers are both pre-coated with composite mixture 55 and pre-cut before being fed into three-dimensional printing system 100 for deposition via print head 68.

In some examples, carbon filaments may be coated with composite mixture 55 via a cross head extrusion process. The additive powders may be well dispersed and distributed in an extrusion process melting the resin prior to coating the bare fiber filament with composite mixture 55 within the crosshead. Depending on the type and amount of additive powder, a twin screw extruder may provide better distributive and dispersive mixer over a single screw extruder. In some examples, a gear pump may be used after the extruder to transfer the resin to the crosshead as the gear pump delivers precise control of the melt flow to the crosshead coating the fiber filament. The gear pump may also be used to hold constant pressure within the crosshead.

Figure 9:
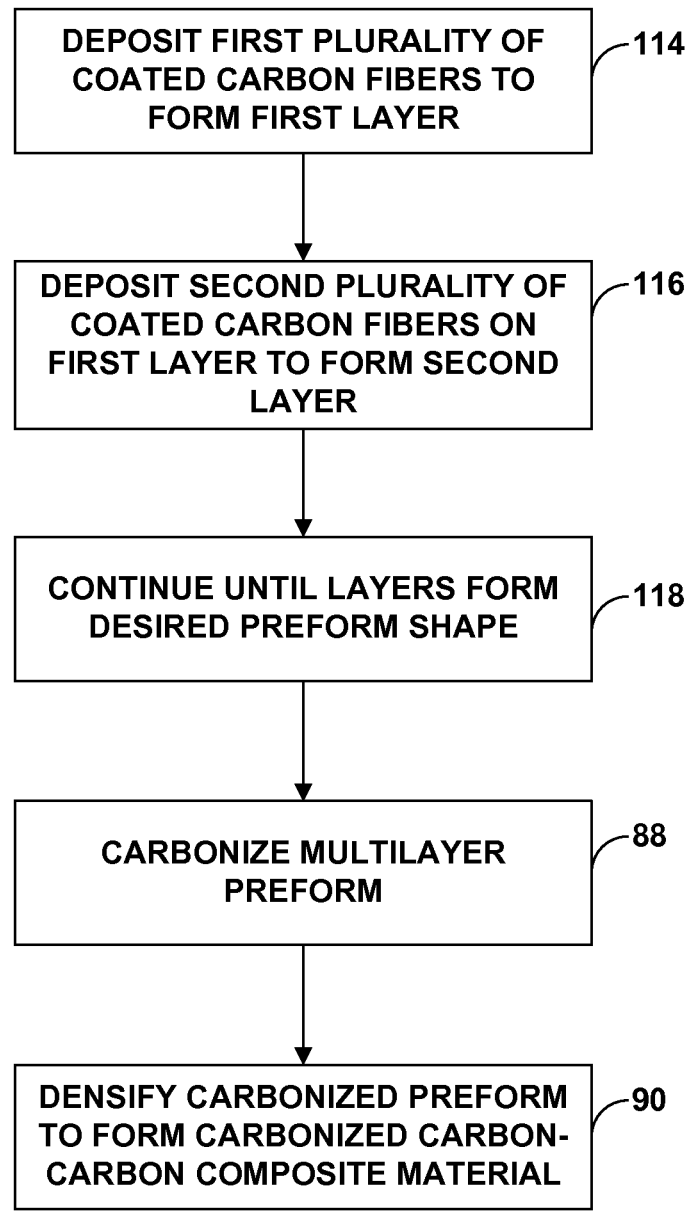
FIG. 9 is a flow diagram illustrating another example method of forming a carbon fiber preform and a densified carbon-carbon composite material from the preform.

FIG. 9 is a flow diagram illustrating another example technique of forming preform 50 and, subsequently, a densified C—C composite material from preform 50 in accordance with aspects of the disclosure. The example of FIG. 9 is described as being performed via system 100 of FIG. 7. However, other systems suitable for carrying out the 3D printing of carbon preform 50 are contemplated.

As shown, under the control of controller 70, print head 68 deposits a first plurality of individual fibers each coated with composite mixture 55 to form a first layer of resin and additive material(s) coated carbon fibers, e.g., layer $54X_1$, on work surface 66 (114). Such a process may include forming individual rows (e.g., corresponding to rows 56 shown in FIG. 4 for layer $54X_4$), to form layer $54X_1$ of the coated carbon fibers in the x-y plane. Controller 70 may control the position of print head 68 throughout the process to provide for a desired layer geometry. In some examples, control of the orientation of the individual fibers in each respective layer may be greater when depositing individual coated fibers, as in FIG. 9, compared, e.g., to depositing a composite material with carbon fibers mixed in composite mixture 55, as in FIG. 6. For example, the technique of FIG. 9 may provide for relatively high control over the z-axis direction orientation within the individual layers, e.g., wherein some or substantially all of the fibers in an individual layers may be deposited such that the fibers extends out of the x-y plane and into the z-axis direction substantially along (e.g., along or nearly along) the longitudinal axis of the carbon fiber.

Subsequently, print head 68 deposits a second plurality of individual fibers each coated with composite mixture 55 to form a second layer of coated carbon (layer $54X_2$), on first layer $54X_1$ (116). This process more be repeated to form layers $54X_1$, $54X_2$, $54X_3$, $54X_4$, . . . , and $54X_n$ of preform 50 (118). Again, controller 70 may control the position of print head in three-dimensions, among others, throughout the deposition process such that the combination of layers $54X_1$, $54X_2$, $54X_3$, $54X_4$, . . . , and $54X_n$ of composite material 52 form preform 50 with a desired three-dimensional geometry. The multilayer carbon fiber preform 50 may then be carbonized (88) and densified (90) as describe above with regard to the example technique of FIG. 6.

Examples of different techniques for forming carbon fiber preforms have been described. In different examples, techniques of the disclosure may be implemented in different hardware, software, firmware or any combination thereof. In some examples, techniques of the disclosure may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, techniques of the disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    forming a carbon fiber preform comprising a plurality of individual carbon fiber layers, wherein forming each individual carbon fiber layer of the plurality of individual carbon fiber layers comprises:
        forming a fibrous layer comprising a plurality of carbon fibers, and
        depositing a mixture including a resin and an additive powder via a print head of a three-dimensional printing system on the fibrous layer; and
    pyrolyzing the carbon fiber preform to form a carbon-carbon composite.

2. The method of claim 1, wherein the additive powder is configured to at least one of prevent oxidation, modify a friction property, increase a density, or increase a strength of a densified carbon-carbon composite material formed from the carbon fiber preform.

3. The method of claim 1, wherein the additive powder comprises a ceramic powder.

4. The method of claim 3, wherein the ceramic powder is configured to at least one of prevent oxidation or increase a density of a densified carbon-carbon composite material formed from the carbon fiber preform.

5. The method of claim 3, wherein the ceramic powder comprises at least one of silicon carbide powder, titanium carbide powder, or tungsten carbide.

6. The method of claim 1, wherein the additive powder comprises a carbon powder.

7. The method of claim 6, wherein the carbon powder is configured to at least one of modify a friction property or increase strength of a densified carbon-carbon composite material formed from the carbon fiber preform.

8. The method of claim 6, wherein the carbon powder comprises at least one of activated carbon powder, graphite powder, or carbon black powder.

9. The method of claim 1, wherein the mixture includes approximately 0.1 weight percent to approximately 50 weight percent of the additive powder, and approximately 50 weight percent and approximately 99.99 weight percent of the resin.

10. The method of claim 1, wherein the plurality of individual carbon fiber layers includes a first carbon fiber layer and a second carbon fiber layer, wherein a concentration of the additive powder in the first carbon fiber layer is less than a concentration of the additive powder in the second carbon fiber layer.

11. The method of claim 1, wherein the mixture includes the plurality of carbon fibers.

12. The method of claim 1, wherein forming the fibrous layer comprises forming a woven layer comprising the plurality of carbon fibers.

13. The method of claim 1,
    wherein the plurality of individual carbon fiber layers includes a first carbon fiber layer comprising a first additive powder, a second carbon fiber layer comprising a second additive powder, and a third carbon fiber layer comprising a third additive powder, the second carbon fiber layer positioned between the first and third carbon fiber layers,
    wherein a concentration of the second additive powder is different than the first and third additive powders.

14. The method of claim 13, wherein the first and third additive powders comprise a higher concentration of at least one of a ceramic powder or a carbon powder than the second additive powder.

15. The method of claim 13, wherein the second additive powder comprises a higher concentration of a ceramic powder than the first and third additive powders.

* * * * *